R. N. ALLEN & A. B. PULLMAN.
CAR WHEEL.

No. 182,789.

2 Sheets—Sheet 1.

Patented Oct. 3, 1876.

Witnesses
Robt. H Duncan
Benja Smith

Inventors
Richard N Allen
Albert B. Pullman
per Saml A Duncan
Atty.

2 Sheets—Sheet 2.

R. N. ALLEN & A. B. PULLMAN.
CAR WHEEL.

No. 182,789. Patented Oct. 3, 1876.

Witnesses
Rob't H. Duncan.
Benj. A. Smith

Inventors.
Richard N. Allen.
Albert B. Pullman
per Saml A. Duncan
atty.

UNITED STATES PATENT OFFICE.

RICHARD N. ALLEN, OF HUDSON, NEW YORK, AND ALBERT B. PULLMAN, OF CHICAGO, ILLINOIS.

IMPROVEMENT IN CAR-WHEELS.

Specification forming part of Letters Patent No. 182,789, dated October 3, 1876; application filed June 15, 1876.

*To all whom it may concern:*

Be it known that we, RICHARD N. ALLEN, of Hudson, in the State of New York, and ALBERT B. PULLMAN, of the city of Chicago, in the State of Illinois, have invented a new and useful Improvement in Wheels for Railway-Cars, of which the following is a specification:

This invention relates to wheels for railway-cars; and consists in a tire for a car-wheel provided with a rib projecting inwardly from the interior of the tire, and secured to the plate or plates, which form the web or body of the wheel, by means of rings or annular plates which overlap both the rib of the tire and the web of the wheel, and are fastened thereto, the edge of the rib and the plate or plates of the web abutting each other, as hereinafter more fully described.

The manner of constructing car-wheels according to this invention is subject to various modifications in detail, as will be fully understood by reference to the accompanying drawings, wherein is shown what is considered the most advantageous forms of the said invention.

Figure 1:
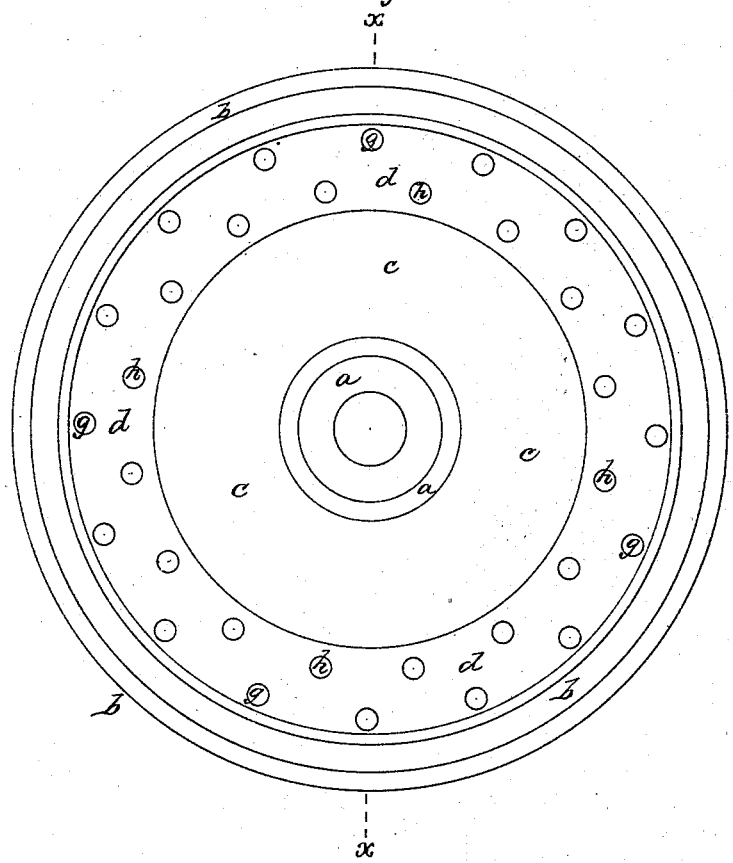
Figure 2:
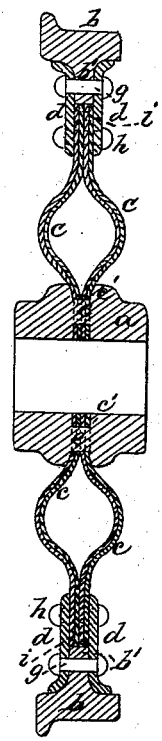
Figure 3:
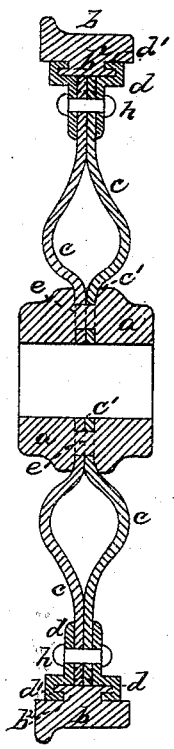
Figure 4:
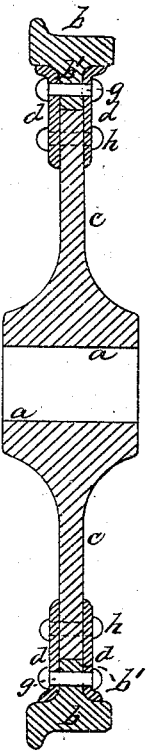
Figure 5:
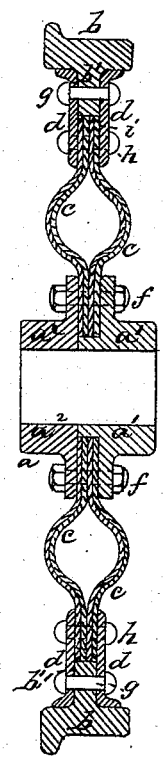

In the drawings, Figure 1 is a front or outside elevation of a wheel containing the invention. Fig. 2 is a transverse section on the line $x\,x$ of Fig. 1. Figs. 3, 4, and 5 are transverse sections of wheels, showing modifications of the invention.

Like letters indicate the same parts throughout the drawings.

$a$ is the hub. $b$ is the tire. $c\,c$ are metal plates or disks, forming the web or body of the wheel. $d\,d$ are rings or annular plates for securing the tire $b$ to the web $c$.

In the wheel shown in Figs. 1 and 2 the hub $a$ is made of cast-iron, the web or body $c$ of plates or disks of iron or steel, and the tire $b$ of steel or analogous metal. In this wheel the plates or disks which form the web $c$ are united to the hub $a$ by forming holes or slots in the portion $c'$ of the plates, immediately in contact with the hub, and the hub is formed by casting the same within the hole or aperture in the central portion of the said plates, in such a manner that the hub projects equally, or nearly so, on both sides of the plates, and the metal flows through the said slots or holes, forming bars or bolts $e$ through the plates, whereby the latter are secured without any possibility of slipping or turning around upon the hub. We do not, however, limit ourselves to this method of uniting the hub and plates, but may use bolts or rivets $f$, as shown in Fig. 5, or other suitable means. The hub may be formed, as shown in Fig. 5, in two parts, $a^1\,a^2$, fitted together, with the plates $c$ between them, the two parts $a^1\,a^2$ and the plates $c$ being secured together by the said bolts or rivets, as shown.

The tire $b$ is provided with a central, or nearly central, inwardly-projecting rim or web, $b'$, whose inner periphery should be turned and well fitted to the exterior periphery of the aforesaid plates $c$. The tire $b$ is secured to the plates $c$ in the following manner: Rings or annular plates $d$, of iron or steel, are fitted to each side of the rim or web $b'$ of the tire, such rings being broad enough to overlap upon the plates $c$, to which they are also closely fitted. These rings have flanges, properly formed to fit the inner periphery of the tire, and extend outward from the inner central rim or web $b'$ toward the sides of the said tire. Through these rings $d$ and the rim or web of the tire are passed bolts or rivets $g$, which fasten the tire and the rings securely together. Bolts or rivets $h$ are also passed through the rings and the plates $c$, and thus the plates $c$ and the tire $b$ are securely united.

An important feature of this invention is the imparting to the wheel, constructed as above described, the quality of elasticity, which is often very advantageous in railway-wheels.

Many contrivances have been suggested and adopted for rendering wheels of this class elastic without impairing their strength and durability, but none of these have been found satisfactory in practice. It is found that wheels constructed in accordance with this invention possess this quality of elasticity, while the strength of the several parts is in no degree impaired. This result is obtained by curving or corrugating the intermediate or central portion of the plates $c$, so that when the plates are fitted in place the sectional form of these portions of the wheel is convex or bulging on each side, and between the plates at this portion of the wheel is a hollow space somewhat elliptical in shape.

It will be obvious to any one familiar with the construction and working of railway-wheels that this formation will impart a useful amount of elasticity to the wheel without any counterbalancing disadvantages. The central elastic portion of the wheel may consist of one, two, or more plates, properly fitted and secured together.

Sometimes it is not necessary or desirable that wheels should possess this property of elasticity, and in such cases the wheels may be made without any transverse curvature or convexity of the plates $c$, as shown in Fig. 4.

According to the modification of this invention, illustrated in Fig. 4, instead of using a cast-iron hub united to the plates or body of the wheel, as above described, the hub $a$ and the web or body $c$ of the wheel are formed of a single piece of iron or steel, and the tire $b$, with its inner rim $b'$, is secured upon the web $c$ by the aid of the rings $d$, as already described. The outer periphery of the web $c$ and the inner periphery of the rim $b'$ of the tire should be turned and well fitted together; and it is preferred that the tire should be shrunk or pressed upon the periphery of the web $c$.

Having thus fully described our invention and shown how the same may be conveniently and advantageously carried into practice, we wish it understood that we do not limit ourselves to the precise form and dimensions of the parts of the wheel shown in the drawings, but may modify the same, as desired, so long as the essential features of the invention, as above specified, are retained.

One of the principal advantages of constructing and securing a tire to the web of a car-wheel as above set forth is that, when the tire becomes worn out by use or broken by accident, it can be easily removed, and another readily substituted therefor. This is done by removing one or both of the annular plates which overlap the web of the wheel and the rib of the tire, which permits the tire to be driven laterally from the periphery of the plate or plates which form the web of the wheel. A new tire can then be substituted in the same manner and with the same effect as the original one.

What we claim as new is—

In a car-wheel, a tire provided with an inwardly-projecting rib, which abuts against the periphery of the plate or plates that compose the web or body of the wheel, and is secured thereto by means of rings or annular plates, bolted or riveted both to the web and the rib of the tire, substantially as and for the purose set forth.

RICHARD N. ALLEN.
ALBERT B. PULLMAN.

Witnesses:
ROBT. H. DUNCAN,
BENJ. A. SMITH.